(12) United States Patent
Allsop et al.

(10) Patent No.: US 6,764,093 B2
(45) Date of Patent: Jul. 20, 2004

(54) COLLAPSIBLE WHEELBARROW

(75) Inventors: James D. Allsop, Bellingham, WA (US); Eivind Clausen, Bellingham, WA (US); Charles D. Highlander, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 0 days.

(21) Appl. No.: 10/043,893

(22) Filed: Jan. 9, 2002

(65) Prior Publication Data

US 2003/0034620 A1 Feb. 20, 2003

Related U.S. Application Data

(60) Provisional application No. 60/313,233, filed on Aug. 17, 2001.

(51) Int. Cl.[7] .................................................. B62B 1/00
(52) U.S. Cl. ..................... 280/653; 280/47.315; 220/9.4
(58) Field of Search ................................ 280/653, 654, 280/47.31, 652, 659, 47.18, 47.24, 47.3, 47.315, 47.32, 47.33, 79.2; D34/16; 383/4, 34; 294/55; 298/2, 3; 248/95, 98; 220/9.1, 9.4

(56) References Cited

U.S. PATENT DOCUMENTS

| | | | | |
|---|---|---|---|---|
| 618,900 A | * | 2/1899 | Oakey | 280/653 |
| 676,163 A | * | 6/1901 | Victor | 280/653 |
| 705,406 A | * | 7/1902 | House et al. | 280/653 |
| 2,215,592 A | * | 9/1940 | Nelson | |
| 2,494,199 A | * | 1/1950 | Provitola | 280/47.31 |
| 2,660,446 A | * | 11/1953 | Edhardt | 280/47.31 |
| 2,672,348 A | * | 3/1954 | Scott | 280/47.31 |
| 2,967,058 A | * | 1/1961 | Hoffmann, Jr. | 280/47.24 |
| 3,675,808 A | * | 7/1972 | Brink | |
| 3,826,511 A | * | 7/1974 | Frank | 280/653 |
| 4,173,351 A | * | 11/1979 | Hetland | |
| 4,796,938 A | * | 1/1989 | Knights | |
| 5,211,434 A | * | 5/1993 | Lanava | |
| 5,222,536 A | * | 6/1993 | Hodgdon et al. | |
| 5,222,757 A | * | 6/1993 | Magyar | 280/653 |
| 5,393,022 A | * | 2/1995 | Palumbo | 248/95 |
| 5,433,462 A | * | 7/1995 | Groleau | 280/659 X |
| 5,806,878 A | * | 9/1998 | Mroczka et al. | 280/47.31 X |
| 5,971,410 A | * | 10/1999 | Nichols | 280/47.31 |
| 6,161,850 A | * | 12/2000 | James et al. | 280/47.18 |
| 6,186,523 B1 | * | 2/2001 | Aielli | 280/47.31 |
| 6,585,304 B1 | * | 7/2003 | Boozer et al. | 294/55 |

FOREIGN PATENT DOCUMENTS

| DE | 3126724 | * | 1/1983 |
|---|---|---|---|
| DK | 30330 | * | 9/1922 |
| EP | 87258 | * | 8/1983 |
| GB | 1496968 | * | 1/1978 |

* cited by examiner

*Primary Examiner*—Bryan Fischmann
(74) *Attorney, Agent, or Firm*—Christensen O'Connor Johnson Kindness PLLC

(57) ABSTRACT

A collapsible wheelbarrow is constructed with a pliable bin and pivotally connected handle members. The handle members are pivotally connected to a frame about first pivot axes, wherein the handle members may be moved outwardly away from an imaginary bisecting line of the wheelbarrow to provide easier loading capabilities. The handle members may also be pivotally connected about second pivot axes to allow the handle members to pivot inward to reduce the width of the wheelbarrow for convenient storage. In an alternative embodiment, the handle members are rigidly connected to the frame.

28 Claims, 5 Drawing Sheets

COLLAPSIBLE WHEELBARROW

CROSS-REFERENCES TO RELATED APPLICATIONS

This application claims the benefit of U.S. Provisional Application No. 60/313,233, filed Aug. 17, 2001, the disclosure of which is hereby expressly incorporated by reference.

FIELD OF THE INVENTION

The present invention relates generally to load-carrying devices, and more particularly to wheelbarrows having improved storing and loading capabilities.

BACKGROUND OF THE INVENTION

Load carrying devices such as the conventional wheelbarrow have been used for many years for moving a load of debris or gardening material, such as dirt, leaves, mulch and the like, from one location to another. A wheelbarrow typically consists of a rigid bin adapted to receive a predetermined load, a single wheel rotatably mounted in front of the bin, and two support legs and two handles at the rear of the bin. In operation, to fill the bin of the wheelbarrow, the user can either lift the load by hand or with an implement, such as a shovel, from the ground to the bin. After the bin is filled to the desired level of contents, the user stands to the rear of the bin and lifts the handles upward, thereby pivoting the wheelbarrow about the axis of rotation of the wheel. As the handles are lifted upward, the support legs lose contact with the ground, allowing the user to push the wheelbarrow forward to the desired location. Once the wheelbarrow is at the desired location, the wheelbarrow may be tilted to one side or over the top of the front wheel to dump the contents of the bin on the ground.

Such conventional wheelbarrows are effective, but have numerous drawbacks. For example, the major portion of the work involved in transporting the load material is generated in the initial operation of loading the bin. Since loading the conventional wheelbarrow requires the user to lift the load contents from the ground to the bin, this may lead to user fatigue or back strain. Additionally, conventional wheelbarrows are somewhat large and bulky, and thus require a significant amount of space for storage. The size of the wheelbarrow also prevents the user from transporting the wheelbarrow in vehicles other than large vehicles, such as trucks. Thus, there exists a need for an improved wheelbarrow that is easier to load and provides for convenient storage.

SUMMARY OF THE INVENTION

In accordance with aspects of the present invention, a load-carrying apparatus is provided. The load-carrying apparatus includes a frame and a ground-engaging member rotatably coupled to the frame. A pair of spaced-apart elongated handle members are coupled to the frame. A pliable bin is removably coupled to the handle members, the bin adapted to receive a load therein.

In accordance with another aspect of the present invention, the frame of the load carrying apparatus defines a pair of first pivot axes, wherein the elongated handle members are pivotally coupled to the frame about the respective first pivot axes such that the handle members are pivotally moveable between a first position and a second position remote from the first position.

In accordance with yet another aspect of the present invention, the load carrying apparatus includes a frame that is composed of two spaced-apart side members interconnected by a cross member. Each of the side members defines a first pivot axis and a second pivot axis spaced-apart from the first pivot axis. A ground-engaging member is rotatably coupled to the frame between the side members. The load carrying apparatus further includes a pair of spaced-apart elongated handle members pivotally coupled to the frame about either of the respective first or second pivot axes such that the handle members are pivotally moveable between a first position and a second position remote from the first position. A pliable bin is removably coupled to the handle members, the bin adapted to receive a load therein.

In accordance with still another aspect of the present invention, a load carrying apparatus includes a frame and a ground-engaging member rotatably coupled to the frame. A pair of spaced-apart elongated handle members are rigidly coupled to the frame and a pliable bin is removably coupled to the handle members. The bin includes opposing sidewalls, a front wall, and a bottom wall contiguously connected to define an open-ended cavity for receiving a load therein.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention will now be described with reference to the accompanying drawings where like numerals correspond to like elements. The present invention is directed to a collapsible wheelbarrow constructed with a pliable bin and pivotally connected handle members. Each handle member is pivotally connected about first pivot axes, wherein the handle members may be moved outwardly away from an imaginary bisecting line of the wheelbarrow to provide easier loading capabilities. The handle members may also be pivotally connected about second pivot axes to allow the handle members to pivot inward to reduce the width of the wheelbarrow for convenient storage.

Figure 1:
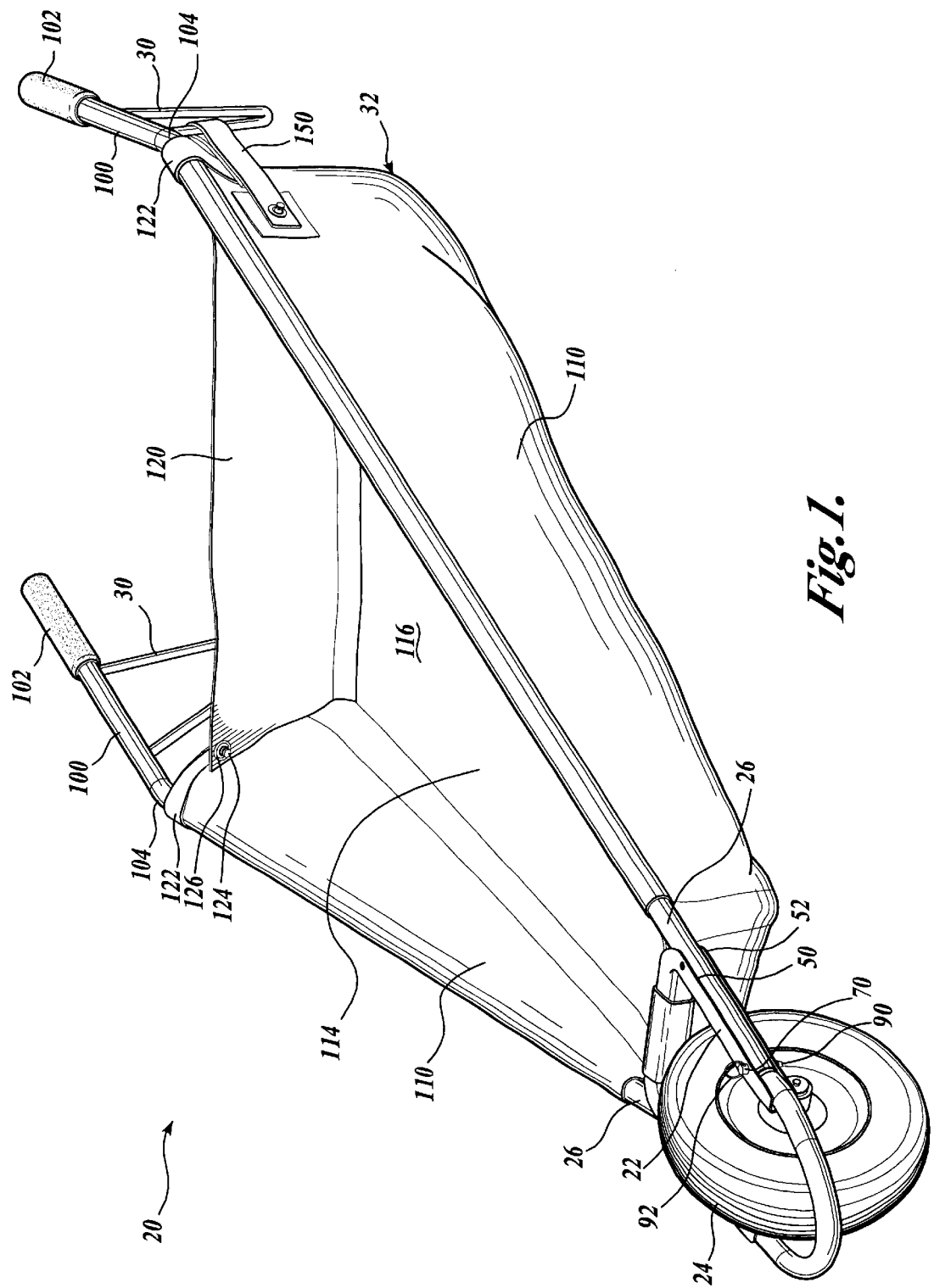
FIG. 1 is a perspective view of a collapsible wheelbarrow in accordance with the present invention.

One exemplary embodiment of the collapsible wheelbarrow, generally designated 20, constructed in accordance with the present invention is illustrated in FIGS. 1–4. As best shown in FIG. 1, the collapsible wheelbarrow 20 (hereinafter "the wheelbarrow 20") includes a frame 22, a wheel 24 rotatably mounted to the frame 22 at the forward end thereof, a pair of elongated handle members 26 pivotally connectable to the frame 22 about two separate pivot axes for outwardly or inwardly swinging movement, and a pair of supporting legs 30 connected to the handle members 26, respectively, and movable therewith. A pliable bin 32 adapted to receive a load of contents, such as debris, is removably mounted to the handle members 26 at the rear of the frame 22.

Figure 2:
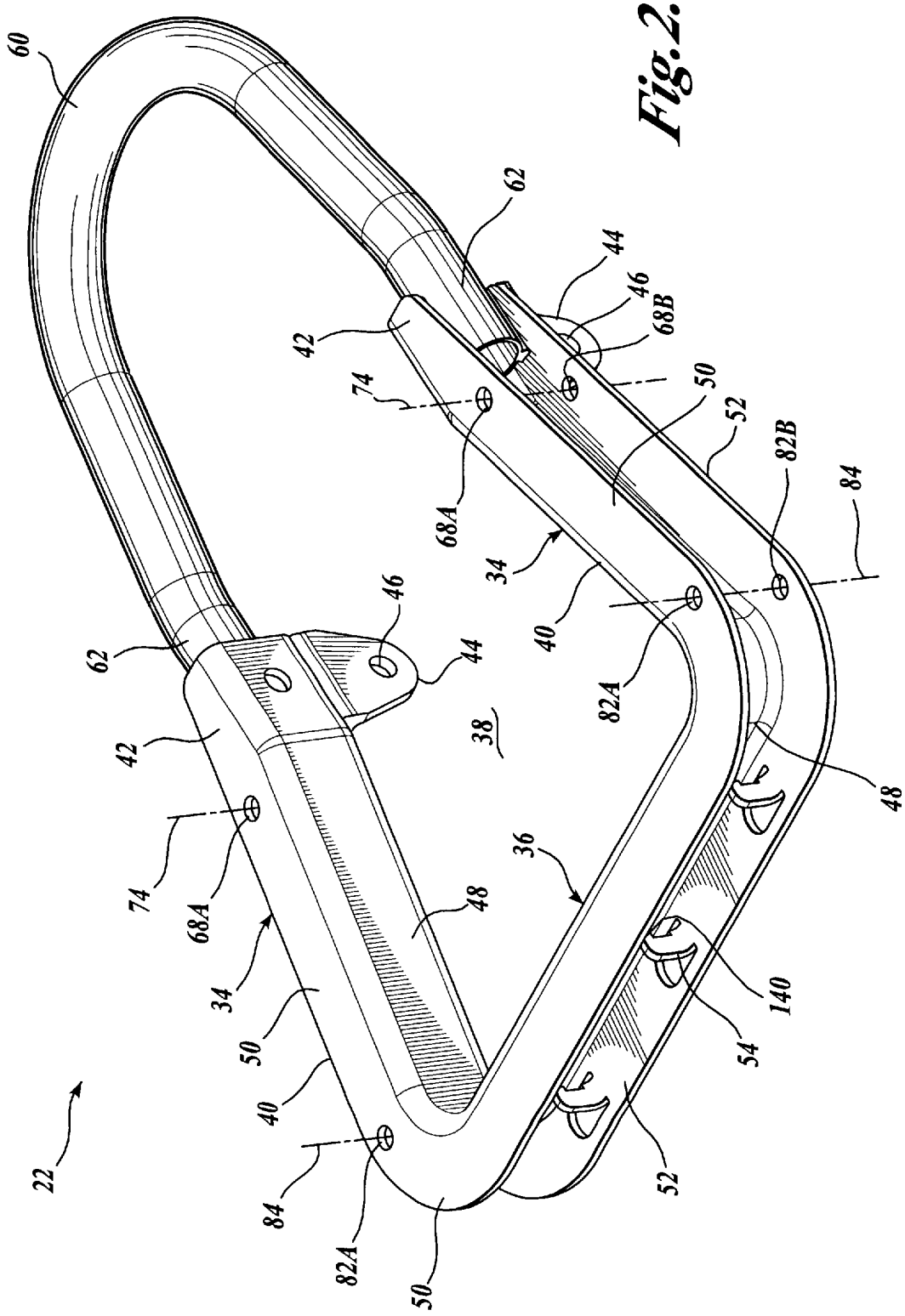
FIG. 2 is a rear perspective view of a frame of the collapsible wheelbarrow of FIG. 1.

Referring now to FIG. 2, the frame 22 includes a pair of spaced-apart side members 34 and a cross-member 36 interconnecting the side members 34. The side members 34 and the cross member 36 form an open cavity 38 adapted to receive the wheel. Side members 34 are each formed with an inward tapering portion 40 and a straightforwardly extending end portions 42. The end portions 42 include downwardly extending wheel mounts 44, which include bores 46 adapted to receive a wheel axle for rotatably mounting the wheel thereto. The side members 34 and the cross-member 36 have generally C-shaped cross-sections formed by upstanding side walls 48 and outwardly extending top and bottom flange members 50 and 52. The cross-member 36 may include protrusions 54 that extend upwardly from the bottom flange 52. The protrusions 54 may be used to secure the bin to the frame 22, as will be described in more detail below.

The frame 22 may also include a U-shaped member 60, the ends 62 of which are secured to the end portions 42 of the frame 22 by any conventional fasteners, such as bolts, rivets or the like, or by welding. The U-shaped member 60 may extend in a plane parallel to a plane defined by the frame 22 and encircles the front of the wheel when assembled. The U-shaped member 60 aids in the removal of the contents of the bin when the user rotates the wheelbarrow over the front wheel. In this position, the U-shaped member 60 engages the ground and provides a stationary pivot point of the wheelbarrow. The wheelbarrow 20 may be vertically stored on hooks with the use of the U-shaped member 60. The frame 22 is preferably constructed from a lightweight metallic material; however, other suitable materials, such as plastic, may be used.

Figure 3:
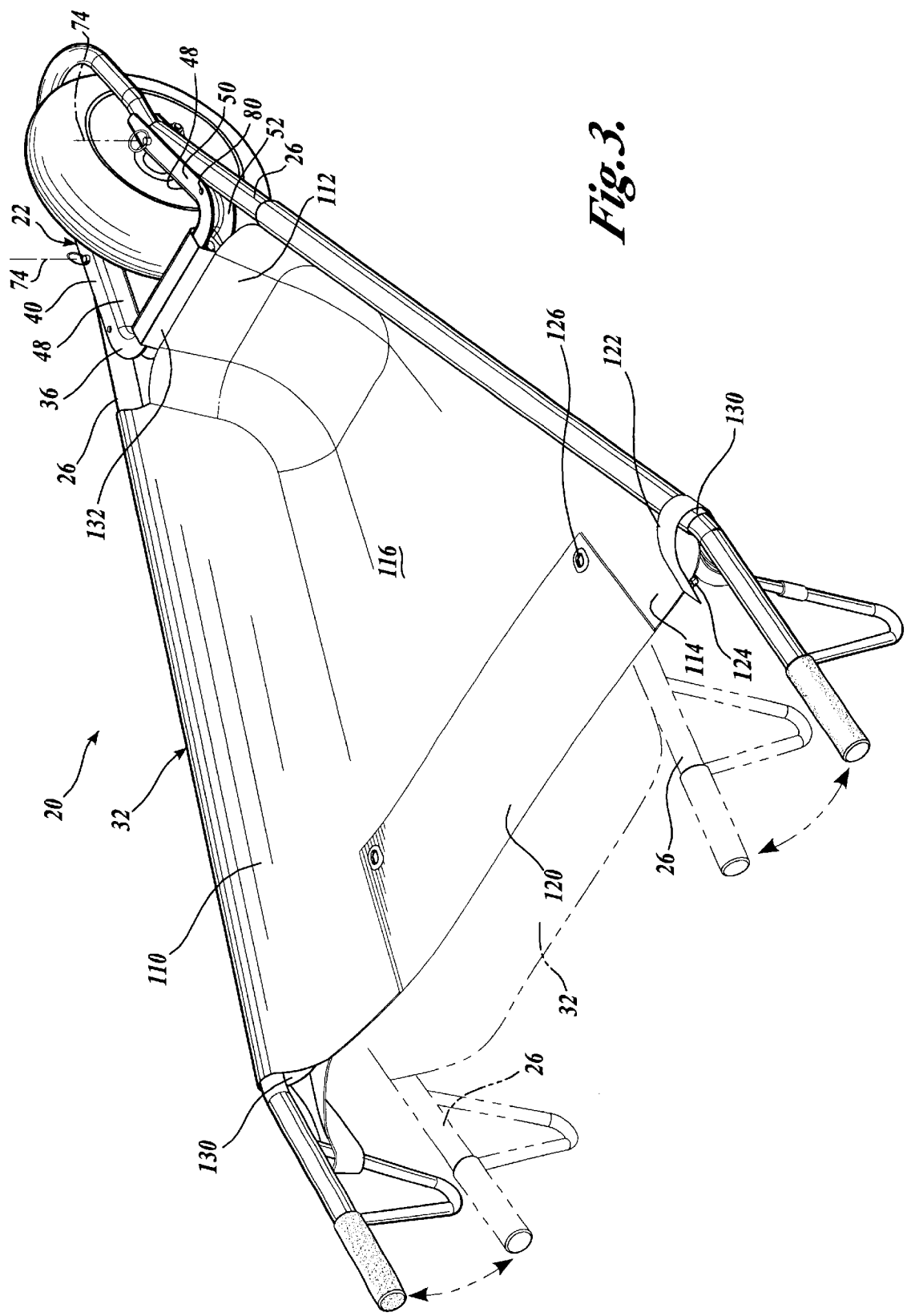
FIG. 3 is a rear perspective view of the collapsible wheelbarrow of FIG. 1 showing the handle members pivoting from a first position depicted in phantom to a second, outwardly pivoted position.
Figure 4:
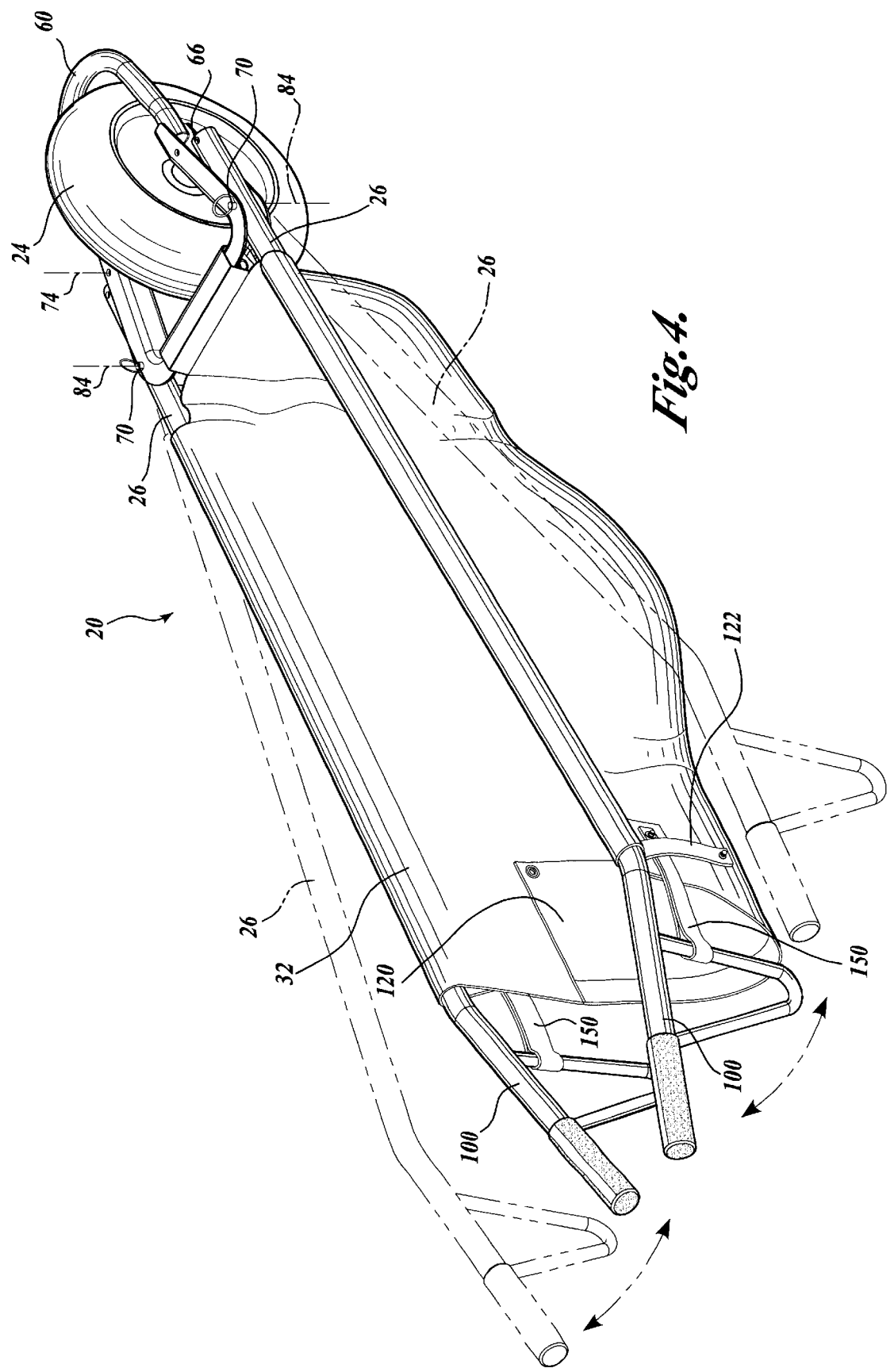
FIG. 4 is a rear perspective view of the collapsible wheelbarrow of FIG. 1 showing the handle members pivoting from a third position depicted in phantom to a fourth, inwardly pivoted position.

Referring back to FIG. 1, each handle member 26 is pivotally connected at its forward end to the respective side members of the frame 22. The ends of each handle member 26 include bores 66 (FIG. 4) alignable with apertures 68A and 68B (FIG. 2), which are disposed in the flanges 50 and 52 of side members 34. The bores 66 and the apertures 68A and 68B are adapted to receive removable fasteners such as detent pins 70, which pivotally connect the ends of handle members 26 to the frame 22 about the first pivot axes 74 (FIG. 2). The forward ends of the handle members 26 further include a second set of bores 80 (FIG. 3) space-apart from and rearward of the bores 66 (FIG. 4). The bores 80 are alignable with apertures 82A and 82B (FIG. 2) disposed in the flanges 50 and 52 of side members 34. The bores 80 and the apertures 82A and 82B are adapted to receive the detent pins 70, and define second pivot axes 84 (FIG. 3).

The detent pins 70 include a shaft 90 having a looped section 92 at one end and a ball bearing (not shown) outwardly biased orthogonal to the longitudinal axis of the shaft 90 at the other. Such detent pins 70 are well known in the art and thus will not be described in more detail here. It will be appreciated that the forward ends of the handle members 26 may be pivotally connected to the frame 22 through other known removable fasteners, such as straight pins, cotter pins, bolts (including or excluding a corresponding nut), to name a few. When connected, the forward ends of the handle members 26 may seat between the flanges 50 and 52 of the frame 22. Due to the tapered portion of the frame 22, the free ends 100 of the handle members 26 diverge as they extend rearwardly from the frame 22 when the forward ends are in their seated position, forming a somewhat triangular shaped void.

Figure 5:
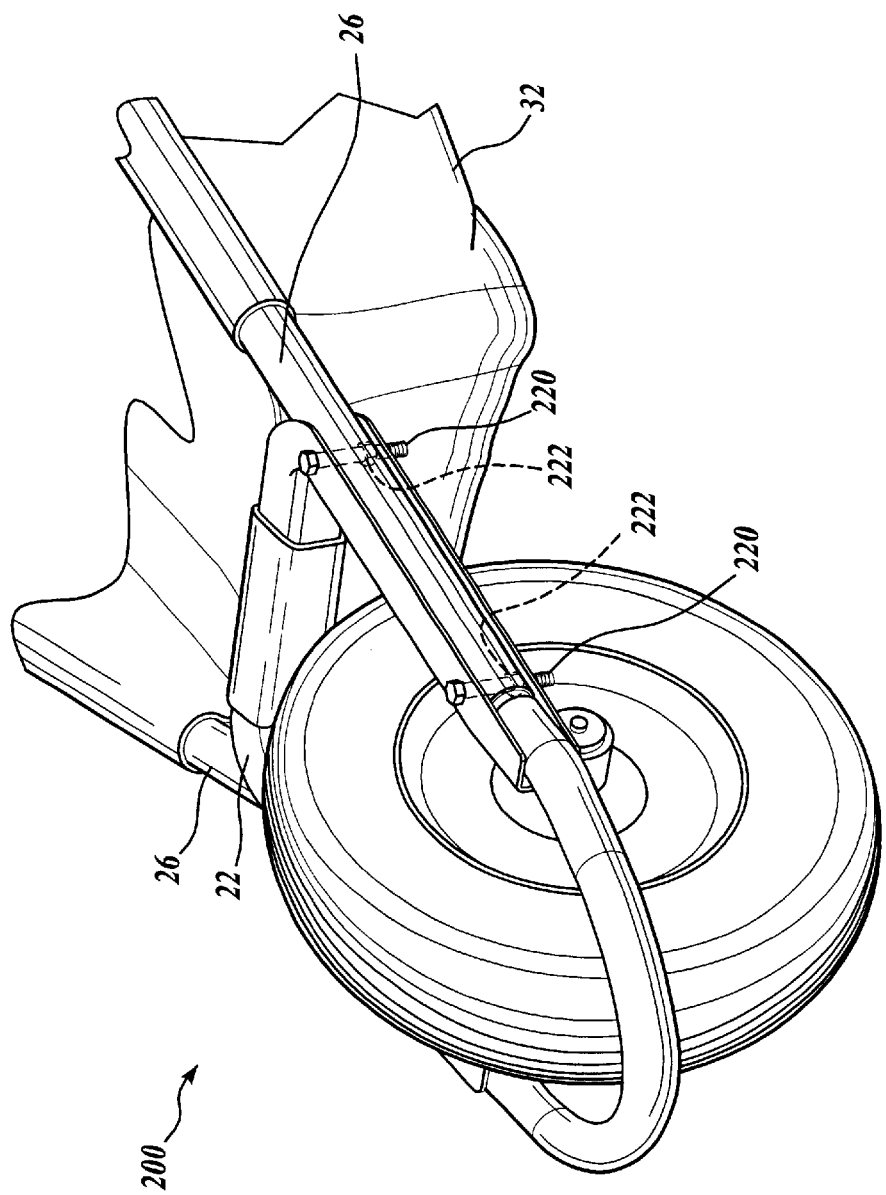
FIG. 5 is a partial perspective view of an alternative embodiment of the collapsible wheelbarrow in accordance with the present invention.

While the handle members 26 are pivotally connected to the frame 22 as discussed above and illustrated herein, it will be appreciated that the wheelbarrow 20 can be configured such that the handle members 26 are rigidly attached, either removably or permanently, to the frame 22. For example, a second pair of detent pins may also be inserted through the bores 80 of the handle members and the apertures 82A and 82B of the frame. Referring now to FIG. 5, an alternative embodiment of a collapsible wheelbarrow 200 formed in accordance with the present invention is shown. The collapsible wheelbarrow 200 (hereinafter "wheelbarrow 200") is substantially identical in construction, material, and operation as the wheelbarrow 20 described herein and illustrated in FIGS. 1–4 with the following differences that will now be described in detail.

FIG. 5 is a partial view of the forward end of the wheelbarrow 200. The forward ends of the handle members 26 are rigidly attached to the frame 22 by conventional fasteners, such as bolts 220 and their corresponding nuts 222. However, it will be appreciated by those skilled in the art that other removable and non-removable fasteners may be utilized to rigidly attach the handle members 26 to the frame 22, or that the handle members 26 may be permanently connected to the frame 22 by fastening methods, such as welding. Additionally, it will be readily evident to those skilled in the art how to pivotally attach the handle members 26 to the frame 22 by bolts, as suggested above with reference to the embodiment of FIGS. 1–4, or to rigidly attach the handle members 26 to the frame 22 by bolts 220, as shown in FIG. 5, and thus, it will not be explained in any greater detail. Moreover, it will be appreciated that the various embodiments of the wheelbarrow having pivotally or rigidly connected handle members may incorporate all, or some combinations thereof, of the additional features of the wheelbarrow, which will now be described in detail.

The handle members 26 are provided with respective handgrips 102 at their free ends 100. Due to the divergence of the handle member 26, the free ends 100 of the handle members 26 may bend inward toward the imaginary bisecting line of the wheelbarrow at a point 104 forward of the handgrips 102. This provides the portions of the handle members 26 past the point 104 to extend substantially parallel to one another for a comfortable lift position for the user. The supporting legs 30 are respectively fixed to the handle members 26 at their free ends 100, adjacent to handgrips 102. The supporting legs 30 are substantially V-shaped and extend in a downward direction away from handle members 26. When connected to the frame 22, the handle members 26 extend in a rearward direction, in the same plane as the frame 22.

The wheelbarrow 20 of the present invention further includes a selectively removable bin 32 constructed of a pliable material, such as rubber, reinforced fabric, canvas, or nylon, to name a few. FIG. 3 illustrates a rear perspective view of the wheelbarrow 20 with the bin 32 positioned between the handle members 26 and rearward of the frame 22. The bin 32 is generally triangular in shape, which corresponds to the void created by the diverging handle members 26. The bin 32 includes sidewalls 110, a front wall 112, and a bottom wall 114 contiguously connected to form an open-ended cavity 116. To prevent the contents of the bin 32 from spilling out during use, the bin 32 may include an optional rear flap 120. The rear flap 120 extends from the bottom wall 114 and may be folded inwardly into the cavity 116 or outwardly away from the cavity 116. The rear flap 120 may be selectively secured to the sidewalls 110 of the bin 32 by any type of conventional releasable fasteners to form the rear wall of the bin 32, as shown best in FIG. 1. In the embodiment shown in FIG. 1, a strap 122 is attached to each side wall 110 and contains a turnable type latch 124 to cooperate with eyelets 126 formed in the top of the rear flap 120.

Returning to FIG. 3, the sidewalls 110 of the bin 32 are removably connected to the handle members 26. The side walls 110 of the bin 32 may be connected to the handle members utilizing any number of fastening techniques, such as by straps, hooks, eyelet/turnable latch fasteners, or combinations thereof, to name a few. In the embodiment shown, tubular pockets 130 are formed on the side walls 110 of the bin 32 by flaps folded over and secured by stitching, adhesive, fasteners, or the like. When assembled, the handle members 26 pass through the pockets 130. The front wall 112 of the bin 32 may also be connected to the cross member of the frame 22. In the embodiment shown, the bin 22 further includes a front flap 132 extending from the front wall. The front flap 132 includes eyelets (not shown) reinforced by grommets (not shown). The eyelets are adapted to receive the protrusions 54 (FIG. 2) of the frame 22. When assembled, the front flap 132 is folded over the top of the cross member 36 and wrapped around the body of the cross member 36. Once the front flap 132 is wrapped around the cross member 36, the eyelets are placed over the protrusions 54 (FIG. 2), the protrusions extending upward through the eyelets. To help secured the front flap 132 to the frame 22, the protrusions 54 may include lip portions 140 (FIG. 2).

Referring back to FIG. 1, the pliable bin 32 may include retaining members in the form of straps 150. The straps 150 are attached to the sidewalls 110 of the bin 32. When assembled, the ends of the straps 150 loop around the supporting legs 30 and fasten to the sidewalls 110 of the bin 32 through conventional releasable fasteners. The straps 150 retain the bin 32 is a somewhat stationary position during use. The pliable bin 32 may include other desirable features, such as side flaps (not shown), which hingedly connect to side walls 110 and are adapted to cover the contents of the bin 32 when loaded.

The operation of the wheelbarrow 20 having pivotally connected handle members will now be described with reference to FIGS. 1–4. FIG. 1 is a perspective view of the wheelbarrow 20 showing the handle members 26 in a first position, with the handle members 26 seated within the flanges 50 and 52 of the frame 22. The removable detent pin 70 is placed through bores 66 (FIG. 4) and apertures 68A and 68B (FIG. 2) so that the handle members 26 may pivot outwardly from the imaginary bisecting line of the wheelbarrow 20 about the first pivot axes 74 (FIG. 4). The pliable bin 32 is removably coupled to the handle members 26 at the rear of the frame 22, and the support legs 30 are engaged with the ground.

To load the wheelbarrow 20, the rear flap 120 is uncoupled from the side walls 110 of the bin 32, and may be folded inward as shown best in FIG. 3. Alternatively, the rear flap 120 may be folded away from the cavity 116 of the bin 32. The handle members 26 may then be pivoted outwardly away from the imaginary bisecting axis of the wheelbarrow 20, somewhat horizontal to the plane defined by the ground. FIG. 3 is a rear perspective view of the wheelbarrow 26 showing the handle members 26 pivoting from a first position depicted in phantom to a second, outwardly pivoted position. With the handle members 26 in the second position and resting against the ground, the bottom wall 114 of the pliable bin 32 lays substantially flush with the ground for easy loading from the rear. For example, rocks can be easily rolled into the bin 32 or dirt, leaves, or debris may be swept into the bin 32. After the bin 32 is filled to the desired level of contents, the user stands rearward of the pliable bin 32, between the outwardly extending handle members 26. In this position, the user may move the handle members 26 to the first position by lifting upward and pulling inward until the forward ends of the handle members 26 abut against the side walls 48 of the tapered portion 40 and seat between the flanges 50 and 52 of the frame 22, as shown best in FIG. 1.

In the first position shown in FIG. 1, the user can lift the handle members 26 upward, thereby pivoting the wheelbarrow 20 about the axis of rotation of the wheel 24. Since the forward ends of the handle members 26 are seated between the flanges 50 and 52, the majority of the force generated by the upward lifting of the handle members 26 is exerted against the top flange 52. As the handle members 26 are lifted upward, the supporting legs 30 lose contact with the ground, allowing the user to push the wheelbarrow 20 forward to the desired location. Once the wheelbarrow 20 is at the desired location, the wheelbarrow 20 may be tilted to one side or over the top of the wheel 24 to dump the contents of the bin 32 on the ground.

It will be appreciated by those skilled in the art that the pliable bin 32 provides additional benefits during use. For example, if heavy debris, such as rocks, are loaded into the bin, the pliable bin 32 envelops the load. By enveloping the load, the pliable bin 32 helps keep the load from shifting during use. Additionally, the center of gravity of the pliable bin 32 is much lower to the ground than with conventional wheelbarrows. This provides more stability and easier maneuverability during use. Further, the pliable bin 32 may be turned inside out when dumping the contents of the pliable bin 32 to remove such contents that tend to stick to the bottom or sides of conventional bins, such as leaves.

To store the wheelbarrow 20, the detent pins 70 are removed from the first pivot axes 74 and moved to the second pivot axes, as shown in FIG. 4. FIG. 4 is a rear perspective view of the wheelbarrow 20 showing the handle members 26 pivoting from a third position depicted in phantom to a fourth, inwardly pivoted position. The detent pins 70 are routed through bores 80 (FIG. 3) and the second set of apertures 82A and 82B (FIG. 2) so that the handle members 26 may pivot inwardly toward the imaginary bisecting line of the wheelbarrow 20 about the second pivot axes 84, as shown by the arrows. Once the pins 70 are in place, the handle members 26 may be pivoted inward about the second pivot axes 84 from a third position (substantially identical to the first position described above, except for the detent pin placement) to a fourth position by exerting force against the free ends 100 of the handle members 26. In the fourth position, the handle members 26 are close together and the pliable bin 32 folds together to reduce the width of the wheelbarrow 20 for convenient storage. If desired, the wheelbarrow 20 may be stored vertically in the collapsed position by being suspended from a wall. To this end, the frontwardly extended U-shaped member 60 attached to the frame can be conveniently hung over a hook secured to the wall.

To use the wheelbarrow 20 from the collapsed position shown in FIG. 4, the user only has to pivot the handle members 26 outwardly until resting in the third position, and move the detent pins 70 from the second pivot axes 84 to the first pivot axes 74.

The operation of the wheelbarrow 200 having rigidly connected handle members will now be described with reference to FIG. 5. The operation of the wheelbarrow 200 is substantially identical to that of wheelbarrow 20 insomuch as the wheelbarrow 200 may be loaded from the rear due to the hingedly coupled rear flap 120 shown in FIG. 5). Additionally, the wheelbarrow of FIG. 5 may achieve a collapsed position similar to that shown in FIG. 3 if the handle members are rigidly connected to the frame by removable fasteners, such as bolts. To achieve the collapsed position, the forward positioned bolts must be removed, and the rearward bolts must be loosened to allow for inward pivoting movement of the handle members 26.

While the frame of the wheelbarrow has been described above and illustrated herein as having a C-shaped cross section, it will be appreciated by those skilled in the art that the frame may have other cross-sectional shapes, such as rectangular or tubular. In an embodiment where the cross-section of the frame is either tubular or rectangular, the forward ends of the handle members may be formed with outwardly extending top and bottom flanges that are adapted to receive the frame in a seated position. The handle members may then be pivotally connected via removable fasteners such as detent pins, which are routed through aligned apertures and bores in the flanges of the handle members and the frame respectively.

While the exemplary embodiments of the invention has been illustrated and described, it will be appreciated that various changes can be made therein without departing from the spirit and scope of the invention.

The embodiments of the invention in which an exclusive property or privilege is claimed are defined as follows:

1. A load carrying apparatus comprising:
a frame defining a pair of first pivot axes and a pair of second pivot axes remote from said first pair of pivot axes;
a ground-engaging member rotatably coupled to said frame;
a pair of spaced-apart elongated handle members pivotally coupled to said frame; and
a pliable bin removably coupled to said handle members, said bin adapted to receive a load therein;
wherein said handle members are pivotally coupled to said frame about said respective first pivot axes such that said handle members are pivotally moveable between a first position and a second position remote from said first position, and are adapted to be pivotally coupled to said frame about said respective pair of second pivot axes such that said handle members are pivotally moveable between a third position and a fourth position remote from said third position.

2. The apparatus of claim 1, wherein said handle members are pivotally moveable between said first position, wherein said handle members engage against a portion of said frame, and said second position, wherein said handle members are pivoted outwardly from said frame.

3. The apparatus of claim 1, wherein said handle members are pivotally moveable between said third position, wherein said handle members engage against a portion of said frame, and said fourth position, wherein the free ends of said handle members are pivoted inwardly with respect to an axis of said frame.

4. The apparatus of claim 1, wherein said second position is different from said fourth position.

5. The apparatus of claim 1, wherein said first position is substantially identical to said third position.

6. The apparatus of claim 1, wherein said frame includes two spaced-apart side members interconnected by a cross member, said ground engaging member rotatably coupled between said side members.

7. The apparatus of claim 6, wherein said side members have C-shaped cross-sections defined by upstanding sidewalls and outwardly extending flanges.

8. The apparatus of claim 6, wherein each of said side members includes a first set of aligned apertures, and wherein each of said handle members includes a first bore extending therethrough, said first sets of aligned apertures defining said first pivot axes.

9. The apparatus of claim 8, further including a pair of removable fasteners adapted to be routed through said first sets of apertures and said first bores, said handle members pivotally coupled about said respective first pivot axes by said removable fasteners.

10. The apparatus of claim 8, wherein each of said side members includes a second set of aligned apertures, and wherein each of said handle members includes a second bore extending therethrough, said second sets of aligned apertures defining said second pivot axes.

11. The apparatus of claim 10, further including a pair of removable fasteners adapted to be routed through said second sets of apertures and said second bores, said handle members pivotally coupled about said respective second pivot axes by said removable fasteners.

12. The apparatus of claim 11, wherein said removable fasteners are detent pins.

13. The apparatus of claim 9, wherein said removable fasteners are detent pins.

14. The apparatus of claim 6, wherein a portion of each of said side member tapers inwardly toward said ground engaging member, thereby causing said handle members to diverge as said handle members extend from said frame.

15. The apparatus of claim 1, further including supporting members outwardly extending from said respective handle members and engageable with a ground surface.

16. The apparatus of claim 1, wherein said pliable bin is constructed from a material selected from the group consisting of canvas, nylon, and rubber.

17. The apparatus of claim 1, wherein said pliable bin includes retaining members to retain said pliable bin in a substantially stationary position.

18. The apparatus of claim 17, wherein said retaining members are straps.

19. A load carrying apparatus comprising:
a frame including two spaced-apart side members interconnected by a cross member, each side member defining a first pivot axis and a second pivot axis spaced-apart from said first pivot axis;
a ground engaging member rotatably coupled to said frame between said side members;
a pair of spaced-apart elongated handle members pivotally coupled to said frame about either of said respective first or second pivot axes such that said handle members are pivotally moveable between a first position and a second position remote from said first position; and
a pliable bin removably coupled to said handle members, said bin adapted to receive a load therein.

20. A load carrying apparatus, comprising:
a frame including first and second spaced-apart side members interconnected by a fixed cross member, said first and second side members defining first and second pivot axes and first and second engagement surfaces, respectively, wherein said first and second engagement surfaces are oriented in a non-orthogonal manner with respect to said pivot axes;

a ground-engaging member rotatably coupled to said frame between said side members;

a pair of spaced-apart elongated handle members pivotally coupled to said frame about said respective pivot axes such that said handle members are pivotally moveable between a first position and a second position different from said first position; and a pliable bin removably coupled to said handle members, said bin adapted to receive a load therein;

wherein said handle members engage said first and second engagement surfaces of said frame in said first position so as to facilitate steering of said apparatus.

21. The apparatus of claim 20, wherein said side members have C-shaped cross-sections defined by upstanding sidewalls and outwardly extending flanges, said sidewalls forming said first and second engagement surfaces of said frame.

22. The apparatus of claim 21, wherein said handle members are substantially locked within said side members in said first position due to said extending flanges, said sidewalls, and an inward force applied by the user during movement of the apparatus, thereby forming an integral steering unit that facilitates steering of said apparatus.

23. The apparatus of claim 20, wherein a portion of said bin is removably coupled to said frame.

24. The apparatus of claim 20, wherein said frame includes first and second engagement members coupled to and extending outwardly from said side members, said handle members contacting said first and second engagement members in said first position so as to facilitate rotation of said frame and said handle members about said ground surface engaging member.

25. The apparatus of claim 20, wherein each of said handle members includes an engagement member extending therefrom, said engagement members contacting said side members of said frame in said first position so as to facilitate rotation of said frame and said handle members about said ground surface engaging member.

26. The apparatus of claim 20, wherein said engagement surfaces are oriented substantially parallel to said pivot axes.

27. A load carrying apparatus, comprising:

a frame including first and second spaced-apart side members interconnected by a fixed cross member, said first or second side member defining a pivot axis and an engagement surface, wherein said engagement surface is oriented in a non-orthogonal manner with respect to said pivot axis;

a ground-engaging member rotatably coupled to said frame between said side members;

a first elongated handle member pivotally coupled to said frame about said pivot axis such that said handle member is pivotally moveable between a first position and a second position different from said first position;

a second elongated handle member connected to said frame a spaced distance from said first handle member; and a pliable bin coupled to said handle members, said bin adapted to receive a load therein;

wherein said first handle member engages said engagement surface in said first position so as to facilitate steering of said apparatus.

28. The apparatus of claim 27, wherein said second elongated handle member is pivotally connected to said frame.

* * * * *

UNITED STATES PATENT AND TRADEMARK OFFICE
CERTIFICATE OF CORRECTION

PATENT NO. : 6,764,093 B2
DATED : July 20, 2004
INVENTOR(S) : J.D. Allsop et al.

It is certified that error appears in the above-identified patent and that said Letters Patent is hereby corrected as shown below:

Column 8,
Line 31, "side member" should read -- side members --

Column 10,
Line 22, "spaced distance" should read -- spaced-apart distance --

Signed and Sealed this

Twenty-first Day of June, 2005

JON W. DUDAS
*Director of the United States Patent and Trademark Office*